United States Patent [19]

Freischlad

[11] Patent Number: 5,737,081
[45] Date of Patent: Apr. 7, 1998

[54] EXTENDED-SOURCE LOW COHERENCE INTERFEROMETER FOR FLATNESS TESTING

[75] Inventor: Klaus R. Freischlad, Tucson, Ariz.

[73] Assignee: Phase Shift Technology, Inc., Tucson, Ariz.

[21] Appl. No.: 761,632

[22] Filed: Dec. 6, 1996

Related U.S. Application Data

[63] Continuation-in-part of Ser. No. 400,921, Mar. 9, 1995, abandoned.

[51] Int. Cl.⁶ ........................................................ G01B 9/02
[52] U.S. Cl. ........................................ 356/360; 356/345
[58] Field of Search ............................... 356/345, 346, 356/359, 360, 353

[56] References Cited

U.S. PATENT DOCUMENTS 5,495,334 2/1996 Nagoshi et al. ........................ 356/346
5,504,578 4/1996 Kopf ...................................... 356/345
5,528,369 6/1996 Starkey ................................. 356/346
5,546,185 8/1996 Okumura et al. ..................... 356/346

*Primary Examiner*—Georgia Y. Epps
*Assistant Examiner*—Robert Kim
*Attorney, Agent, or Firm*—LaValle D. Ptak

[57] ABSTRACT

An interferometer particularly suitable for testing the flatness of transparent plano-parallel test pieces employs an extended spatially non-coherent light source. The source is directed to a first beam splitter at an angle of incidence other than normal; and the beam is split into first and second spatially non-coherent divergent wavefronts. A reference surface reflects the first wavefront and a surface under test reflects the second wavefront. A second beam splitter receives and recombines the first and second reflected spatially non-coherent wavefronts; and an interference detector is located to receive the combined reflected wavefronts to produce the interferogram. The distance traveled by the wavefronts from the first beam splitter to the detector is equal, and the optical characteristics of the light path traveled by both wavefronts is the same.

16 Claims, 3 Drawing Sheets

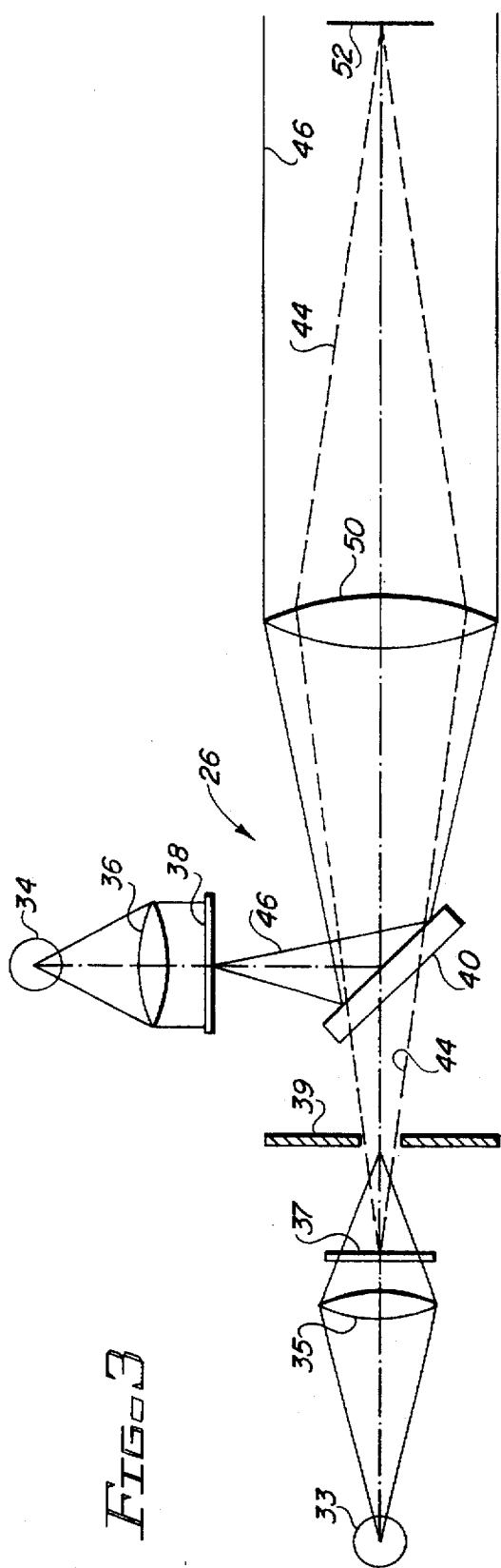
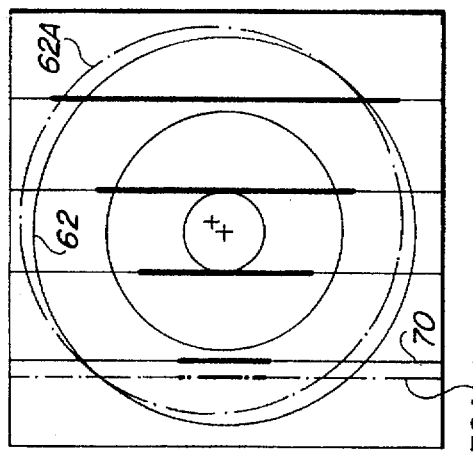
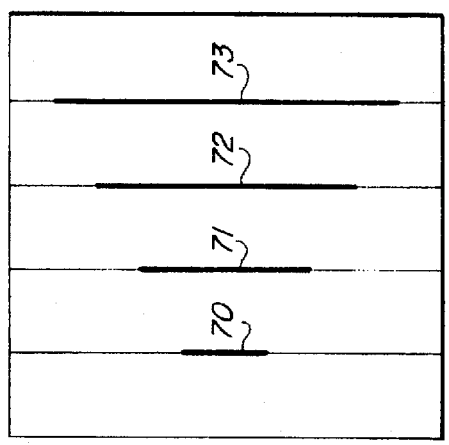
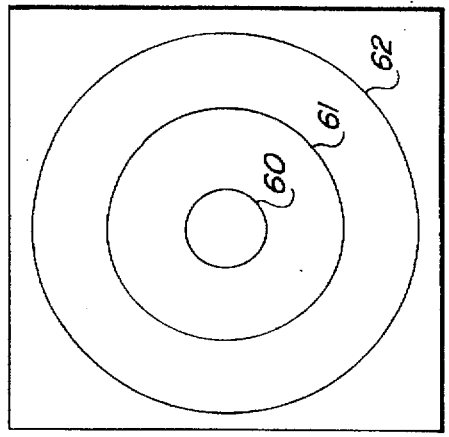

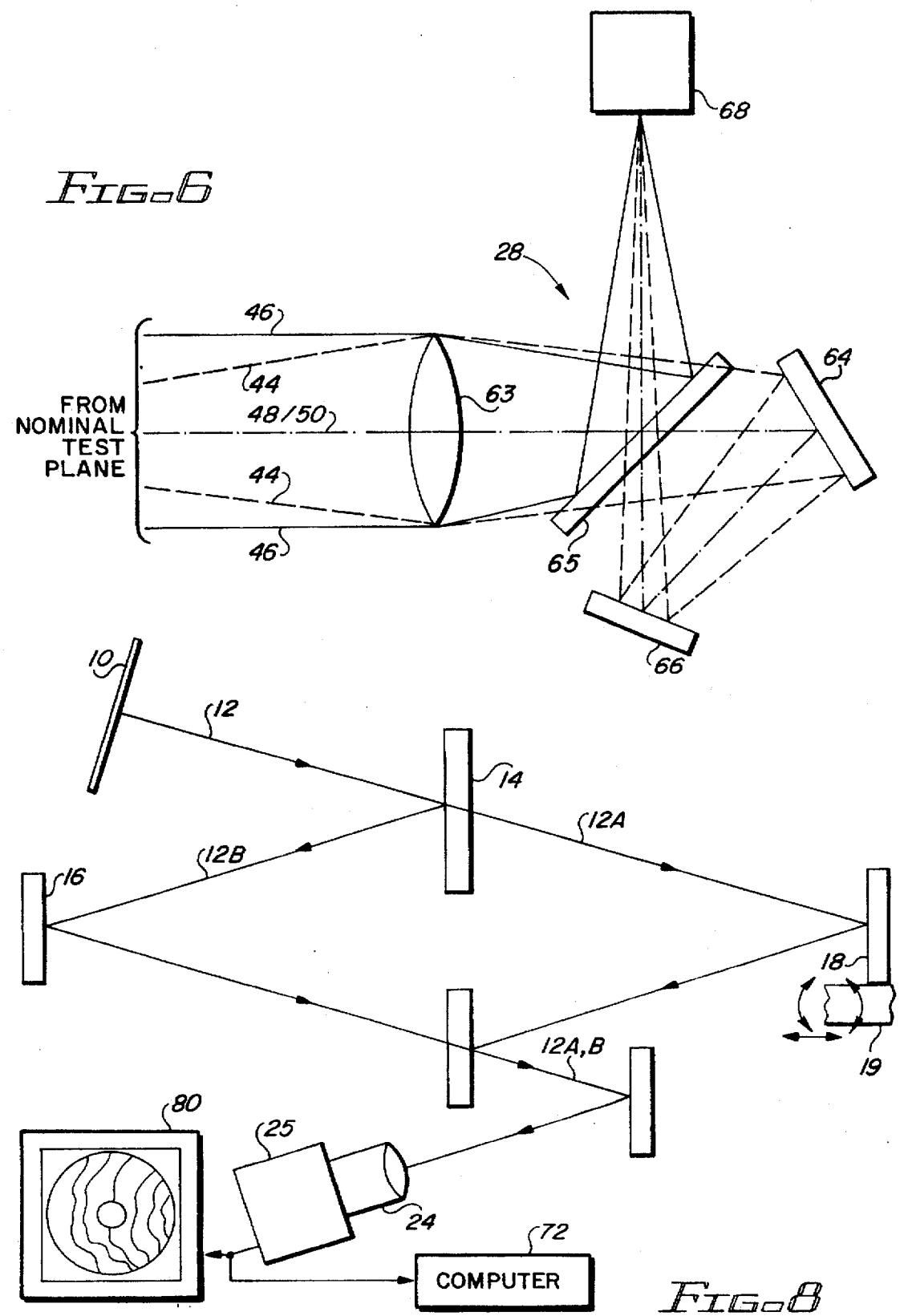

EXTENDED-SOURCE LOW COHERENCE INTERFEROMETER FOR FLATNESS TESTING

RELATED APPLICATION

This application is a continuation-in-part of U.S. Ser. No. 08/400,921, filed on Mar. 9, 1995 now abandoned.

BACKGROUND

Interferometric testing long has been used in optical metrology for the testing of smooth, optically flat optical surfaces. A variety of commercial interferometers are used for this purpose; and they mainly are of the Fizeau or Twyman-Green type used to rapidly and accurately measure the distortion of surfaces or transmitted wavefronts. Since no physical contact of the article under test is required, these instruments are particularly suitable for use in testing the surfaces of computer disks, silicon wafers, and the like.

In general purpose interferometers of the type mentioned above, a laser is used to produce a coherent light beam which is expanded by the combination of a focusing lens and a collimator lens. Typically, a Helium-Neon (HeNe) laser, emitting light at a wavelength of 633 nm, is employed. The focusing lens focuses the laser beam into a small spot in its' back focal plane. This small spot can also be considered the effective light source for the interferometer. The collimating lens in turn collimates the beam diverging from the focused spot. Thus, the focusing lens and collimator lens act together as an inverted telescope to provide an expanded, collimated beam. The diameter of the collimator lens then defines the maximum beam diameter, and therefore determines the maximum size of the flat part under test. With the Fizeau interferometer, the reference flat is placed after the collimator lens. The last surface of the reference flat reflects part of the light back into the system. This reflected portion of the light constitutes the reference beam. The transmitted part of the beam is reflected by the test surface back into the system. This constitutes the test beam. Both the reference beam and the test beam are directed together toward an imaging lens and a camera, where they combine to produce interference fringes. The Domenicali U.S. Pat. No. 4,201,473 is directed to this type of system.

As shown in the Domenicali patent, the two beams supplied through the imaging lens are focused on a camera, the output of which then produces a display of the interference pattern (interferogram) on a video monitor for visual analysis. It should be noted that the beam splitting surface in a Fizeau interferometer is also the reference surface.

An alternate interferometer configuration is the Twyman-Green type mentioned above. In a Twyman-Green interferometer, the laser beam is expanded, as in the Fizeau interferometer. The beam splitter, however, is placed at an angle with respect to the beam (instead of perpendicular, as in a Fizeau interferometer), thereby physically separating the reference beam optical path and the test beam optical path. The reflected beam is directed toward the reference surface, and the transmitted beam toward the test surface. The two beams are reflected by the respective test and reference surfaces back toward the beam splitter. At the beam splitter, the transmitted portion of the reference beam and the reflected portion of the test beam are combined and relayed by an imaging optic onto a camera, where they combine to produce an interference pattern. In a Twyman-Green interferometer, the beam splitting surface and the reference surface are separate.

Laser based Fizeau interferometers and Twyman-Green interferometers are easy to use. After the test piece is placed in front of the instrument, only the tilt of the test piece needs to be adjusted until a sufficiently small number of tilt fringes occurs on the camera. In general, the distance of the test piece from the interferometer is not an important consideration, because of the high coherence collimated light beam. An alignment aid usually is provided for the tilt adjustment, which helps the user to direct the test beam along the optical axis of the interferometer. The alignment aid typically consists of a diffuse screen in the rear focal plane of the collimator lens where a portion of the test beam and reference beam is focused. An auxiliary optic images the screen onto a camera. Since the beam is collimated after the collimator lens, the positions of the spots on the screen from the reference beam and the test beam do not depend on the location or distance of the test and reference surface from the interferometer, but only on their tilts. The reference and test surfaces are aligned when their respective spots are centered and coincide on the screen.

The ease of use of Fizeau interferometers and Twyman-Green interferometers is due to the high spatial and temporal coherence of the laser sources presently used. Good coherence between the test beam and the reference beam is required to obtain the interference fringes with good contrast. The temporal coherence is inversely related to the bandwidth of the light. A narrow band source, such as from a Helium-Neon (HeNe) laser has a large coherence length, i.e. the optical path difference between the test beam and the reference beam can be large before the fringe contrast is reduced. In other words, the distance from the beam splitter of the interferometer to the test surface is not critical. Good contrast fringes are obtained for a whole range of distances. For a laser source, this coherence length can be on the order of several meters. For a broad band, white light source, this distance range is as low as a few microns.

In addition to the high degree of temporal coherence, the laser sources also have a very high degree of spatial coherence. The spatial coherence is related to the effective source size. In contrast to the laser source consisting essentially of one very small point source, an extended spatially incoherent source can be thought of as a large number of independent elementary point sources distributed over the spatial extent of the source. The light from each elementary point source can only interfere with itself, but not with light from other elementary point sources. Thus, the final interference pattern is a superposition of the individual interference patterns from each elementary point source. The overall fringe contrast is good if the individual interference patterns from each elementary point are lined up with respect to each other. If the individual interference patterns don't coincide such that the bright fringes of same patterns fall on the dark fringe of other patterns, then the overall fringe contrast is washed out. With an extended spatially incoherent source, fringes can be seen only in certain planes, depending on the geometry of the interferometer and the alignment of the test surface and the reference surface. Thus, the fringes are localized in space with an extended source, whereas with a point source the fringes are non-localized, i.e. they occur for all planes in space from close to the interferometer to infinity. This fringe localization occurs even for narrow-band light with a high degree of temporal coherence (see for a more detailed explanation M. Born and E. Wolf, *Principles of Optics*, 5th edition, chapter 7.5.3, Pergamon Press, Oxford 1975). With the effective point source in laser-based interferometers the fringes are non-localized, and again the distance of the test surface to the beam splitter of the interferometer is not critical for the measurement.

The coherence properties of the laser, which make the alignment of the test piece simple, also lead to certain problems. One problem occurs when testing transparent, plano-parallel test pieces. For such transparent test pieces, not only light reflected at the front surface under test is directed back into the interferometer, but also light reflected at the back surface. The light from the back surface interferes with the reference beam, and also with the test beam reflected at the front surface. From the resulting interferogram, which now consists of three interference patterns, it is impossible to determine the shape of the front surface of the test piece.

To eliminate this problem of parallel reflection from the back surface of a transparent plano-parallel test piece, the back surface of the test piece may be painted with an index-matched absorbing paint. This prevents or reduces the reflection from the back surface. In many instances, however, this invasive technique cannot be tolerated because it is cumbersome, it leaves a contaminated surface even after cleaning, or, for some test pieces, the paint coating may even warp the test piece, if the piece is very thin. Recently, thin glass flats have become of substantial commercial importance in the form of glass substrates for magnetic disks and flat panel displays. For these products, the Fizeau interferometers and Twyman-Green interferometers discussed above are subject to the problems mentioned with respect to reflection from the back surface of the test piece.

Coherent noise represents another important problem, which generally arises from the point-like nature of the laser light source and its temporal coherence. All practical optical surfaces have surface imperfections, at which forward-scattering of the impinging light occurs. This scattered light interferes with the unscattered light and leads to a granular, speckled appearance of the interferograms. Measured phase maps, based on these interferograms, then show a roughness (noise) which is not really present on the test surface but is a measuring artifact. The roughness can be smoothed out, but then the fine detail of the surface under test also is lost. Thus, high precision measurements at very high spatial and height resolution are virtually impossible with a spatially highly coherent light source.

Efforts to overcome the above noted disadvantages have included an extended-source interferometer in the form of a Newton interferometer. In such an interferometer, a large source with a short coherence length is used. The basic configuration of this interferometer is similar to the Fizeau interferometer; but an extended source and no collimating lens is used. The test piece then is brought into close proximity to the reference surface. The spacing necessarily is near-contact, due to the extended broad-band source of light. As a result, the test is almost no longer a non-contact test. While this instrument is simple, the part handling in a test using a Newton interferometer is difficult, because the surfaces become scratched easily. It is very difficult to position and remove a test piece without contacting the reference flat.

It is desirable to provide an interferometer for flatness testing of plano-parallel glass plates and also opaque flats which overcomes the disadvantages of the prior art devices discussed above, which is simple to use, and which does not require suppression of reflection from the rear surface.

SUMMARY OF THE INVENTION

It is an object of this invention to provide an improved interferometer.

It is another object of this invention to provide an improved interferometric testing method.

It is an additional object of this invention to provide an improved interferometer system for testing of the surfaces of plano-parallel transparent plates.

It is a further object of this invention to provide an improved low coherence interferometer particularly suited for, but not restricted to, the testing of thin transparent substrates, as well as opaque substrates, to produce measurements with a high signal-to-noise ratio.

In accordance with a preferred embodiment of this invention, an interferometer employs an extended spatially non-coherent light source to produce a non-collimated beam of light. A first beam splitter receives the non-collimated light from the light source and split's the beam into first and second spatially non-coherent divergent wavefronts. A reference surface is located to reflect the first wavefront and a surface under test is located to reflect the second wavefront. A second beam splitter is located to receive and combine the first and second reflected spatially non-coherent wavefronts; and an interference detector is located to receive the first and second reflected wavefronts, after combination by the second beam splitter. The distance traveled by each of the wavefronts from the first beam splitter to the detector is equal.

BRIEF DESCRIPTION OF THE DRAWINGS

FIG. 3 is a schematic diagram showing details of an align projector used in the operation of the system of FIG. 2;

FIG. 4 is a diagram of a tilt reticle;

FIG. 5 is a diagram of a distance reticle;

FIG. 6 is a schematic diagram of an align detector used in the operation of the device of FIG. 2;

FIG. 7 is a schematic diagram of the reticle images received in the align detector of FIG. 6; and FIG. 8 is a schematic diagram of the preferred embodiment of the invention in the operating mode.

DETAILED DESCRIPTION

Figure 1:
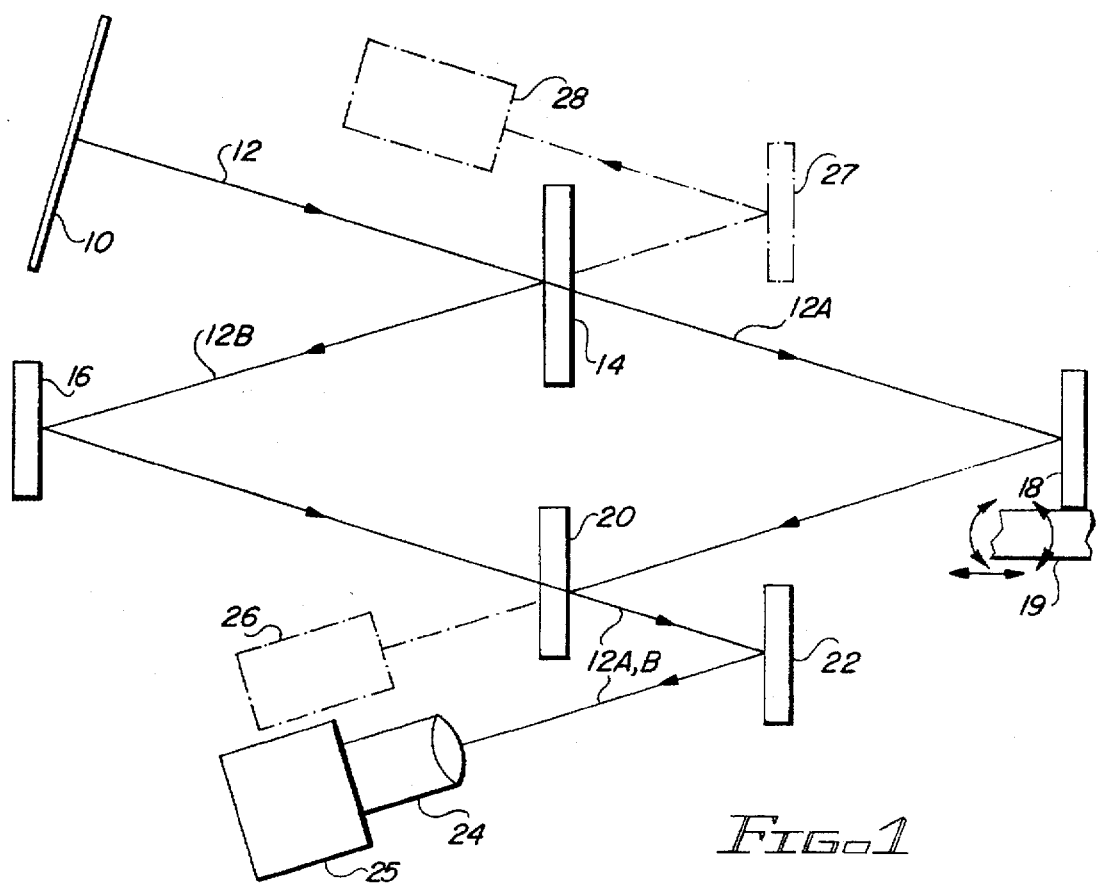
FIG. 1 is a block diagram of a preferred embodiment of the invention.

Reference now should be made to the drawings, in which the same reference numbers are used throughout the different figures to designate the same components.

The embodiment shown in the drawings is directed to an interferometer ideally suited for testing the surface shape of nominally flat surfaces. The system is particularly suited for testing the surfaces of plano-parallel glass plates without the need to suppress the reflection from the rear surface of such plates. In addition, no coherent noise is present in the interferograms, allowing measurements with a very high signal-to-noise ratio. This allows measurement of small surface heights to nanometer resolution over large surface areas. The instrument shown in the drawings can be used with monochromatic as well as with white light. If desired, phase shifting techniques may be employed for the data acquisition and phase reduction. Since the instrument of the preferred embodiment of the invention may be used with white light, a coherence scan technique also may be used for surfaces with large amounts of out-of-flatness.

Although this interferometer instrument is ideally suited to the testing of thin glass substrates, of magnetic disks or flat panel displays, its use is not restricted solely to such uses. The system also is well suited for the testing of highly reflective surfaces, since the reflectivity of the reference surface can be chosen accordingly (better matched to the test surface reflectivity), and no multiple beam interference occurs (due to non-normal incidence on the beam splitters). The system principle and design also is suitable for scaling to large test piece diameters.

Reference now should be made to FIG. 1, which is a schematic diagram of a preferred embodiment of the invention. The interferometer shown in FIG. 1 may be considered to be a modified Mach-Zehnder interferometer. The typical Mach-Zehnder interferometer, however, is used with collimated light to test objects in transmission and is rarely used for surface testing.

Light from an extended spatially non-coherent source 10 is applied in a beam 12 at an angle of incidence other than perpendicular. (typically about 15°) to a first, partially reflective, partially transmissive plate type beam splitter 14 to produce a pair of diverging wavefronts 12A and 12B. The wavefront 12A is transmitted through the beam splitter 14 from the source 10; and the wavefront 12B is reflected from the front surface of the beam splitter 14, as shown. The two wavefronts 12A and 12B diverge in opposite directions from the beam splitting surface of the beam splitter 14 in equal angular amounts, as is readily apparent from an examination of FIG. 1.

A flat reference mirror surface 16 is located to receive and reflect the wavefront 12B. The plane of the reference mirror surface 16 is parallel to the plane of the beam splitter 14. Similarly, the wavefront 12A is reflected by a test surface 18 (mounted on a support 19), as illustrated, and is recombined with the wavefront 12B by a second beam splitter 20, which also is a partially reflective, partially transmissive plate type beam splitter 20. The beam splitters 14 and 20 are parallel to each other and located in the same plane (parallel to the planes of the surfaces 16 and 18), and have the same optical characteristics. The recombined wavefronts 12A, 12B then are illustrated in FIG. 1 as being directed by a fold mirror 22 toward an imaging objective lens 24 for a camera 25. Alternatively, no camera 25 is used and a viewing screen is placed in the image plane of the objective lens The light from the extended light source 10 is not collimated, but is directly incident upon beamsplitter 14. Thus each point on the test surface and reference surface is illuminated by rays with a whole range of angles of incidence. The rays converging toward the imaging objective 24 reach the camera 25 and create the interference pattern. In the optical imaging train from the light source 10 to the camera 25, the test surface 18 can be considered the field stop, and the f-stop of the imaging objective 24 is the aperture stop. The imaging of the test surface 18 onto the camera 25 is non-telecentric in object space. This means that the central rays are not parallel to the optical axis in object space, but rather converge from the different object points toward the small imaging objective 24. The central ray from an object point is defined as the ray which goes from the object point through the center of the aperture stop (the central ray from a point located at the edge of the test surface is called the chief ray). The light source has to be large enough to provide unvgnetted illumination over the entire test surface 18. Since the employed rays are converging from the light source 10 to the test surface 18 and further to the imaging object 24, the light source has to be larger than the test surface. The light source 10 either may be a direct source, such as ground glass illuminated by one or more lamps, or the pupil of a condenser which images the spatially non-coherent (incoherent) physical light source into the entrance pupil of the imaging objective. If desired, white light may be filtered to narrow the bandwidth of the light used. Also, a solid state light source, i.e. LED, with a somewhat narrow spectrum may be used. A preferred source employs a condenser utilizing a cost-effective Fresnel lens.

This preferred configuration with non-collimated illumination has the advantage that no high quality collimator lens of the size of the test surface is required. This is particularly important for the scaling to large test diameters of a test object 18. The only large high quality optics are the beam splitters 14 and 20 and the reference flat 16, which efficiently can be produced for large diameters. The imaging objective 24 has to be of good imaging quality. Because of the non-telecentric imaging, the central rays converge toward the imaging objective 24; and a small imaging objective is sufficient to image the entire large surface under test 18.

It should be noted that the two beam splitters 14 and 20 are of equal thickness; and they are aligned and mounted in the same plane, with the beam splitting surfaces on opposite sides, as is readily apparent from an examination of FIG. 1. In this configuration, the interferometer is exactly compensated; so that the wavefronts, which are reflected from the reference surface 16 and from the test surface 18 for final recombination, pass through identical thicknesses of glass and undergo the same number of reflections. This produces better fringe contrast if the beam splitting ratio between the test beam and the reference beam is not equal to one.

Figure 2:
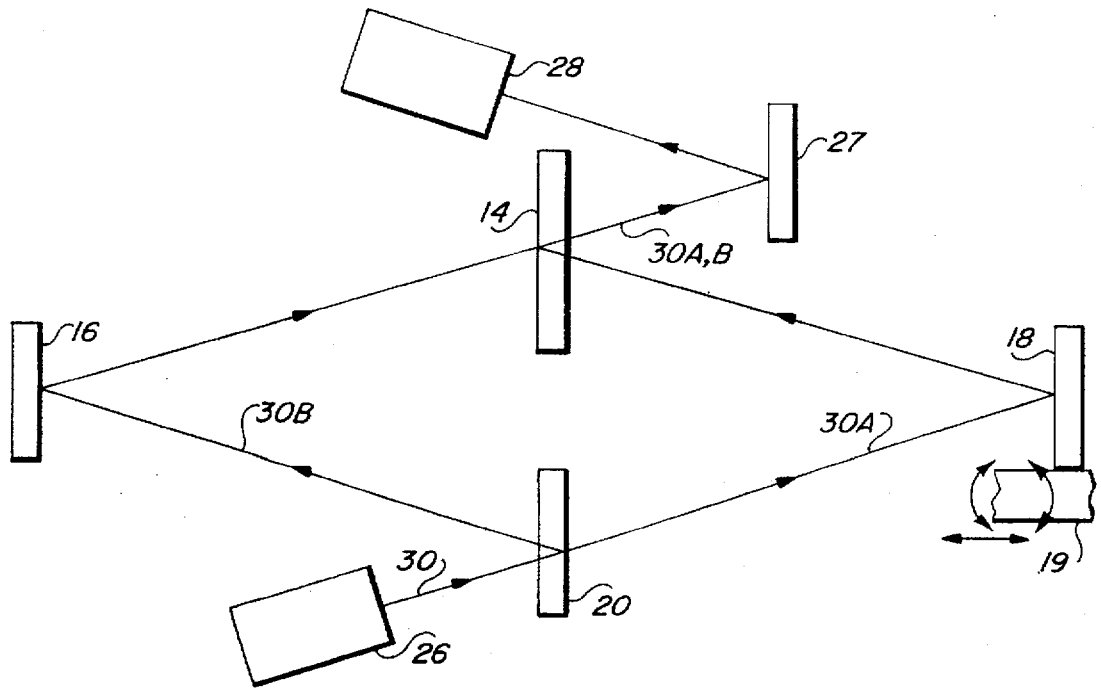
FIG. 2 is a schematic block diagram of a preferred embodiment of the invention in the alignment mode.

As described below in more detail, because of the extended, spatially incoherent light source, and also because of the reduced temporal coherence of the light source, it is required that the test surface 18 be positioned within a-certain range (d) from the interferometer when measurements are taken. Because of the restricted depth range (d) for the test surface, the distance from the test piece to the interferometer has to be aligned in addition to its tilt. If the test piece 18 is not placed at nearly exactly (within d) the correct distance from the interferometer (working distance), no interference fringes will be seen at the camera 25. To provide an alignment aid, the complementary arms of the interferometer, shown in dotted lines in FIG. 1 and in solid lines in FIG. 2, are used. Reference now should be made to FIG. 2, which illustrates the alignment mode of operation of the interferometer.

An align projector 26 projects images from a tilt reticle and a distance reticle as a beam 30 onto the second beam splitter 20. The beam splitter 20 splits the beam 30 into two divergent beams 30A and 30B, with the transmitted beam 30A directed to the surface of the test piece 18 and the reflected beam 30B directed to the surface of the reference 16. After reflection, the beams 30A and 30B are directed to the beam splitter 14, where they are recombined as a beam 30A/30B and directed to a fold mirror 27, and from there to an align detector 28. The manner in which the beam splitters 14 and 20 operate in the alignment mode essentially is identical to the operation described above in conjunction with FIG. 1, but in the reverse direction, as clearly shown in FIG. 2.

The relative locations of the align projector 26 and align detector 28, along with the fold mirror 27, are shown in dotted lines in FIG. 1, superimposing these elements over the interferometer system in its operating mode. Thus, FIG. 1 shows the relative locations of the various components of the system, both for the operating mode and for the alignment mode.

For the tilt alignment, a reticle in the form of concentric circles 60, 61, 62 (FIG. 4) is projected to infinity by the alignment projector 26 (FIG. 3). The detector 28 includes a camera 68 in the focal plane of the lens 63 (FIG. 6). Alternatively, a viewing screen for visual observation may be placed in that plane. As with the Fizeau interferometer described previously, only tip or tilt of the reference surface 18 will displace the tilt reticle image on the camera 68. Tilt or tip alignment is achieved when the reticle image, reflected from the test surface 18 and the reticle image reflected from the reference surface 16 coincide.

In the system described in conjunction with FIGS. 2, 3 and 6, the tilt reticle (the illuminating reticle of FIG. 4) is an extended object projected to infinity. This is accomplished by a lamp 34 providing light to a condenser lens 36 and through the tilt reticle 38 (having the pattern of FIG. 4), placed in the focal plane of the projecting lens 50, and to the reflective surface of a beam splitter 40. The beam 46 from the tilt reticle 38 is shown in solid lines in FIG. 3, and it is reflected from the beam splitter 40 through a projecting lens 50, which collimates the beam 46 and projects an image of the tilt reticle 38 to infinity.

For the distance alignment of the test plane 52 (which in actuality is the front surface of the test piece 18), the align projector 26 projects a reticle image using a lamp 33 to provide light through a condenser 35, the distance reticle 37 (having the pattern 70, 71, 72, 73 shown in FIG. 5), an aperture stop 39 and beam splitter 40 in transmission to the projection lens 50. The beam 44 (shown in dotted lines in FIG. 3) for the distance reticle is focused by the lens 50 at a point on the nominal test plane 52 of FIG. 3 (front surface 18 of the test piece in FIGS. 1 and 2). The camera 68 in the align detector of FIG. 6 is focused onto that same plane when the triangular path using the fold mirrors 64 and 66 is considered.

As shown in FIG. 6, the images reflected from the fold mirror 27 (FIG. 2) are directed through an imaging lens 63 to a beam splitter 65. Because of the angle of incidence between the optical axis and the test surface normal, a displacement of the test surface 18 (52 in FIG. 3) by moving the test surface toward or away from the interferometer, results in a lateral displacement of the reticle image of the pattern in FIG. 5 on the camera. Distance alignment is achieved when the reticle image reflected from the reference surface coincides with the reticle image reflected from the test surface 18. The path of the distance reticle image 44 is through the beam splitter 65 onto a pair of fold mirrors 64 and 66 and again through the beam splitter 65 to the camera 68. The image of the tilt reticle, after passing through the imaging lens 63, is reflected from the reflecting surface of the beam splitter 65 directly to the camera 68, which is placed in the rear focal plane of the imaging lens 60 as seen through the beam splitter 65 in reflection.

Distance alignment and tip and tilt alignment of the platform 19 on which the test piece 18 is mounted is effected until the two images of the distance reticle coincide, and also the two images of the tilt reticle coincide. The two images of each reticle stem from the two different imaging paths, one path with the reflection at the test surface 18, the other path with the reflection at the reference surface 16. FIG. 7 illustrates the pattern as viewed by the camera 68 for effecting tip/tilt and distance alignment of the projected reticle images. The solid lines 70 and 62 represent the patterns of the distance reticle of FIG. 5 and the tilt reticle of FIG. 4, as reflected from the reference surface 16. The dot/dash lines 70A and 62A, respectively, represent the reflected images for the distance reticle and the tilt reticle, respectively, as reflected from a surface of a test piece 18, which is slightly out of alignment. When the circles 62 and 62A coincide and when the lines 70 and 70A coincide, proper alignment of both tip/tilt and distance is effected.

Because of the described projection of the two reticles, the effects of tilt and distance are independent on the align camera 68. This means that tipping and tilting of the test piece 18 does not move the image of the distance reticle. Similarly, translating the test piece toward and away from the reference surface 16 does not move the image of the tilt reticle. Both the tilt/tip adjustment and the distance adjustment are self-referencing in the sense that the reticle image, reflected by the reference surface 16, forms the target location for the reticle image reflected by the surface of the test piece 18. As a consequence, coinciding reticle images ensure the best alignment for both tip/tilt alignment and the distance alignment. To determine the coincidence without ambiguity, the reticle design is non-periodic.

The reticles 37 and 38, shown respectively in FIG. 5 and FIG. 4, are designed as narrow transparent lines on an opaque background. These lines are the straight lines of different lengths 70, 71, 72 and 73 for the distance reticle and are circles 60, 61 and 62 for the tilt reticle. The out of focus light from the beam splitter 65, that is the tilt light transmitted by the beam splitter 65 and the distance light reflected by the beam splitter 65, just leads to a small increase in the background light level. The two reticles are seen simultaneously with only one camera 68. Since the tilt reticle consists of a set of concentric circles and the distance reticle consists of a set of straight parallel lines, the user readily can distinguish between the two reticles and align the test piece 18 by movement of the mounting surface 19, described above, with ease. In general, the tilt reticle and the distance reticle have to be distinguishable when overlaid and viewed at the same time.

The depth discrimination in the test space, i.e. allowing only the light reflected at the front surface of the piece 18 under test to interfere with the reference beam reflected from the reference surface 16, is tailored by adjusting the temporal and spatial coherence.

In an approximation, the effects of temporal and spatial coherence can be separated. The depth-range ($d_t$) can be calculated where only temporal coherence effects are considered. Also, the depth range ($d_s$) can be calculated where only spatial coherence effects are considered.

The temporal coherence is adjusted by placing a bandpass filter with the proper transmission characteristics in front of the imaging objective 24 or other suitable position. The axial displacement $d_t$ for which the contrast is reduced to 10% is related to the filter bandwidth and the angle of incidence by:

$$d_t = 0.428 \frac{\lambda^2}{\delta\lambda} \frac{1}{\cos(\theta_i)} \quad (1)$$

where $\lambda$ is the center wavelength of the filter, $\delta\lambda$ is the full width at half maximum (FWHM) of the filter transmission curve, and $\theta_i$ is the angle of incidence between the optical axis and the normal to the test surface 18. Here we assume a Gaussian transmission profile of the filter.

The spatial coherence is adjusted by varying the f-number of the imaging objective 24. The axial displacement $d_s$ for which the contrast is reduced to 10% is related to the wavelength, the angle of incidence, and the f-number by:

$$d_s = 0.55 \frac{\lambda * fno}{\sin(\theta_i)} \quad (2)$$

where again $\lambda$ is the wavelength of the light, $\theta_i$ is the angle of incidence, and fno is the f-number in test space. Here we assume a circular aperture in the imaging objective.

The light beams in object space between the light source 10 and the imaging objective 24 are spatially incoherent, and thus are incapable of producing interference fringes in the object space. However, the angular filtering by the aperture stop of the imaging objective renders the beams sufficiently spatially coherent in the image space at the camera 25 so that fringes of good contrast can be detected. Thus, the necessary temporal coherence is established by the interference filter placed in front of the imaging objective or other suitable position, whereas the necessary spatial coherence is established by the aperture stop of the imaging objective.

In order to prevent the light reflected at the back surface of the test piece 18 from interfering with the light reflected by the front surface, or reflected by the reference mirror 16, the depth range $d_t$ or $d_s$ is adjusted smaller than the optical thickness of the test piece 18. This causes rear surface reflections to be just added incoherently to the background light.

An illustration of this system configuration for testing surfaces of thin glass flats has been effected with the following implementation:

TABLE 1

| | |
|---|---|
| Maximum diameter of test surface 18 | 100 mm |
| Diameter of reference surface 16 | 100 mm |
| Diameter of beam splitter 14 | 165 mm |
| Diameter of beam splitter 20 | 92 mm |
| Diameter of source 10 | 178 mm |
| F-number in test space | 135 |
| Bandpass filter center wavelength | 676 nm |
| Bandpass filter FWHM | 3 nm |
| Angle of incidence | 15° |
| Working distance | 150 mm |

The resulting depth ranges for 10% contrast are: $d_s$=194 um from the spatial coherence, and $d_t$=67 um from the temporal coherence.

For the particular implementation described in Table 1, the overall depth range is limited by the temporal coherence. However, it is also possible to restrict the depth range by spatial coherence. The depth range easily can be changed by replacing the bandpass filter or by changing the aperture stop of the imaging objective, thus allowing for substantial flexibility.

In the past, Mach-Zehnder interferometers typically have not been used for testing flat surfaces. One reason is the non-normal incidence of the test beam 12 (FIGS. 1 and 8) on the test surface of the test piece 18. This, together with the non-collimated illumination and non-telecentric imaging, produces three effects which require consideration.

First, since the test object 18 to be imaged onto the camera 25 (FIGS. 1 and 8) is tilted, its image plane also is tilted. The camera plane should also be tilted accordingly to assure good imaging for the entire field (known as the Scheimpflug-condition). For many practical configurations, however, this is not necessary, since the depth of field is sufficient. For system parameters of the system listed in Table 1, the depth of field is 24 mm, whereas the maximum axial displacement of the test surface is 13 mm. In this case, diffraction-limited imaging is achieved without tilting the camera 25.

Second, mapping of the test piece onto the camera 25 has distortion. The main effect is anamorphic distortion, resulting in an apparent foreshortening of the test piece. A circular test piece appears as an ellipse on the camera because the imaged surface is tilted. In addition, because of the non-telecentric imaging, there is a varying magnification across the field leading to a keystone-distortion. Both distortion components may be removed from a measured surface map by remapping the data in the computer 72 (FIG. 8). However, for the system parameters listed in Table 1 below, the keystone-distortion is less than one percent, and can be neglected. The anamorphic distortion is 3.4 percent, and is eliminated by remapping using a simple scale factor for one coordinate axis.

The third effect to be considered is a variation of the measurement sensitivity relating the fringe plase in the interferogram to the surface height. This sensitivity varies with the cosine of the angle of incidence of the central rays. The angle of incidence of the central ray for each point of the test surface 18 varies across the field. It consists of a fixed angle offset due to the Mach-Zehnder configuration, and of a varying component due to the non-collimated illumination and non-telecentric imaging. This is different from standard telecentric interferometer configurations where there is a single angle of incidence for all rays. Since the sensitivity factor is uniquely related to the image coordinates, it can be removed from the measured surface map. However, often only an approximate compensation of the sensitivity factor is necessary. For the practical system parameters described in Table 1, the sensitivity factor consists of a constant term, a term linearly varying in x-direction, and a rotationally symmetric quadratic term, where the x-axis of the employed coordinate system lies in the test plane and parallel to the plane of incidence of the axial ray. For the system of Table 1, the constant term is 3.4%, the linear term is 1.7%, and the quadratic term is less than 0.1%. Eliminating only the constant component plus the variation with x reduces the sensitivity variation to less than 0.1 percent, a magnitude which usually can be tolerated. For measurements which require the highest precision, the complete correction, however, can be carried out by the computer 72 (FIG. 8).

One additional complication for the sensitivity correction should be taken into account. Usually, in optical testing, the piston term (the average offset of the optical path difference) of the phase distribution is neglected, because it represents an indication of the position of the test piece and not its surface shape. The sensitivity variation described above, however, applies to the phase resulting from the surface variation of the test piece and the piston term. For example, a perfectly flat test piece at a piston of ten microns will be measured to have peak-to-valley surface error of 10 nm. If higher accuracy is required, the piston term has to be controlled. This is achieved by automatically adjusting the position of the reference surface 16, or, equivalently, of the test surface 18. The adjustment criterion consists of adjusting the reference surface 16 position such that the fringe contrast displayed on the CRT 80 is at its maximum, indicating zero piston. For filtered narrow-band light, the contrast curve can be broad; and the maximum may not be found with the required precision. In that case, the maximum of the broad contrast function is found first. Then, the bandpass filter of the light is removed. The now broad-band light then has a very narrow contrast function. The position of the reference surface is adjusted again with the narrow contrast function; and the piston can be reduced to less than a micron.

It should be noted that the back surface reflection of a plano-parallel transparent glass piece 18 does not disturb the interferometer measurement. No modification of the back surface is necessary, since the temporal and spatial coherence are selected to localize the fringes on or very near the surface under test. No coherent noise is present in the interferogram, thus allowing high accuracy measurements at high spatial resolution. This is due to the low coherence source, since the noise due to coherent scattering and interference is eliminated. It also should be noted that the working distance from the test piece 18 to the instrument (housing the rest of the elements shown in FIG. 1) is large (several inches). This protects the test surface of the test piece 18 and provides easy loading and unloading into and from the test position support 19. This is accomplished by designing the interferometer such that an equal optical path and total glass path compensation, as described above, is used to create a region at a distance from the interferometer where the localization of the interference fringes exist (at the test surface).

The interferometer which is shown in the drawings and which has been described above may be used with monochromatic as well as with white light. A phase shifting technique also may be employed for the data acquisition and phase reduction, in accordance with known techniques. Since the instrument may be used with white light, a coherence scan technique also can be used for surfaces with large amounts of out-of-flatness. Other changes and modifications will occur to those skilled in the art for performing substantially the same function, in substantially the same way, to achieve substantially the same result without departing from the true scope of the invention as defined in the appended claims.

What is claimed is:

1. An interferometer system including in combination:
   an extended spatially non-coherent light source producing a spatially non-coherent, non-collimated beam of light;
   a first beam splitter angularly oriented to receive said non-collimated beam of light from said light source to split said beam of light from said light source into first and second spatially non-coherent divergent wavefronts;
   a reference surface located to reflect said first spatially non-coherent wavefront;
   a surface under test located to reflect said second spatially non-coherent wavefront;
   a second beam splitter located to receive and combine said first and second reflected spatially non-coherent wavefronts; and
   an imaging lens and interference detector located to receive said first and second reflected spatially non-coherent wavefronts after combination thereof by said second beam splitter.

2. The combination according to claim 1 wherein said first and second beam splitters are aligned with one another, and said reference surface and said surface under test are located equal distances from said first and second beam splitters.

3. The combination according to claim 2 further including adjustment apparatus, with said surface under test mounted on said adjustment apparatus for limited movement toward and away from said first and second beam splitters.

4. The combination according to claim 3 wherein said first and second beam splitters have identical characteristics.

5. The combination according to claim 4 wherein said first and second beam splitters are oriented to cause said first and second wavefronts to pass through similar optical paths prior to detection by said interference detector.

6. The combination according to claim 2 wherein said first and second beam splitters have identical characteristics.

7. The combination according to claim 6 wherein said first and second beam splitters are oriented to cause said first and second wavefronts to pass through similar optical paths prior to detection by said interference detector.

8. The combination according to claim 1 further including adjustment apparatus, with said surface under test mounted on said adjustment apparatus for limited movement toward and away from said first and second beam splitters.

9. The combination according to claim 1 wherein said first and second beam splitters have identical characteristics.

10. The combination according to claim 1 wherein said first and second beam splitters are oriented to cause said first and second wavefronts to pass through similar optical paths prior to detection by said interference detector.

11. The combination according to claim 1 wherein said extended light source produces non-coherent white light.

12. The combination according to claim 1 wherein said reference surface and said surface under test both comprise flat surfaces located facing one another in parallel planes with said first and second beam splitters located planes parallel to said parallel planes of said reference surface and said surface under test and located equal distances on opposite sides of a line between the center of said reference surface and said surface under test.

13. An interferometer system including in combination:
    an extended spatially non-coherent light source producing a beam of light;
    a first beam splitter angularly oriented to receive light from said light source to split said beam of light from said light source into first and second divergent wavefronts;
    a reference surface located to reflect said first wavefront;
    a surface under test located to reflect said second wavefront;
    a second beam splitter located to receive and combine said first and second related wavefronts;
    an imaging lens and interference detector located to receive said first and second reflected wavefronts after combination thereof by said second beam splitter;
    an align projector including an alignment light source and distance and tilt reticles, with said alignment light source projecting light through said distance reticle and said tilt reticle and through a projecting lens onto said second beam splitter to produce first and second divergent alignment beams directed to said reference surface and said surface under test, respectively;
    an align detector located to receive said first and second alignment beams reflected from said reference surface and said surface under test from said first beam splitter; and
    apparatus for adjusting the distance between said reference surface and said surface under test and adjusting the tip and tilt of said surface under test relative to said reference surface.

14. The combination according to claim 13 wherein said tilt reticle produces a first pattern projected to infinity by said projecting lens and said distance reticle produces a second pattern, different from said first pattern, focused by said projecting lens onto planes at the nominal test surface position and said reference surface.

15. The combination according to claim 14 wherein said align detector comprises a camera.

16. A method for measuring the flatness of an article under test relative to the flatness of a reference surface comprising the steps of:
    producing an extended spatially non-coherent, non-collimated beam of light;
    splitting said beam of light into first and second spatially non-coherent divergent wavefronts;
    locating a reference surface to reflect said first spatially non-coherent wavefront;
    locating a surface under test to reflect said second spatially non-coherent wavefront;
    recombining said first and second spatially non-coherent reflected wavefronts; and
    imaging and detecting said recombined first and second spatially non-coherent wavefronts whereby the distance traveled by said first and second wavefronts is an identical distance.

* * * * *